July 26, 1966  S. ZELNICK  3,262,833
IMPULSE RADIANT SEALER
Filed Dec. 17, 1963
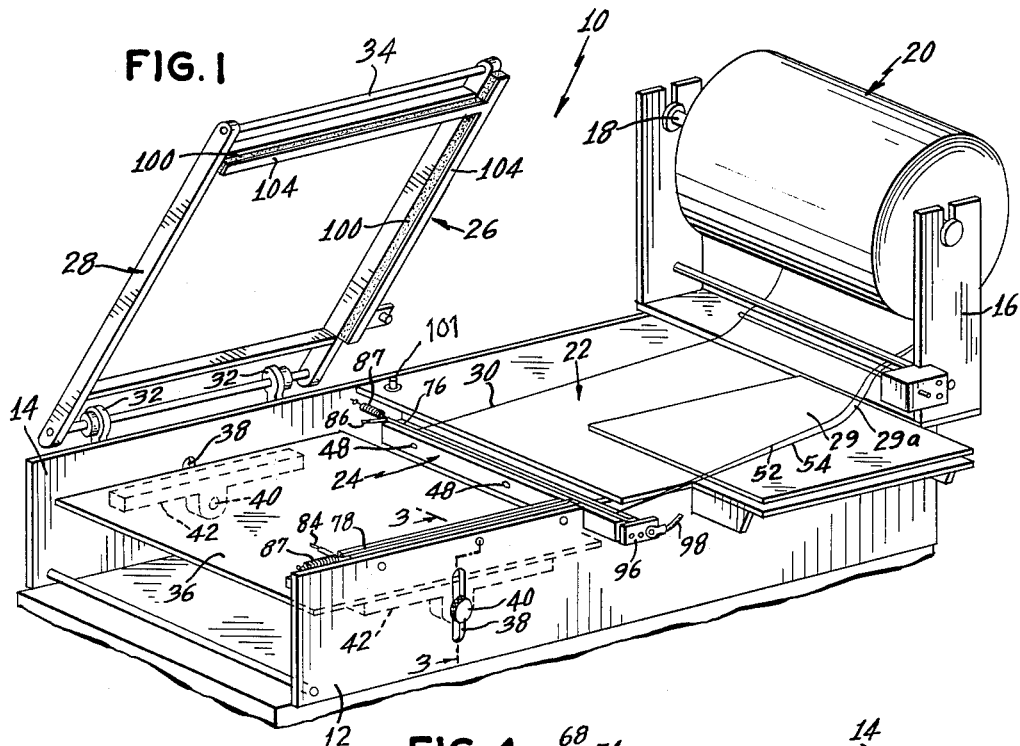
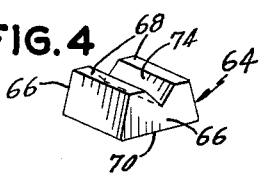
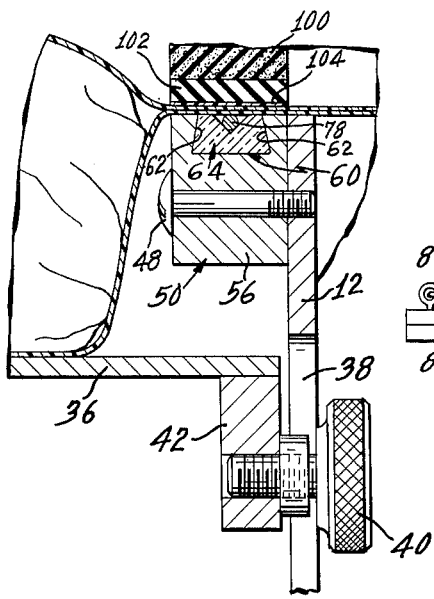
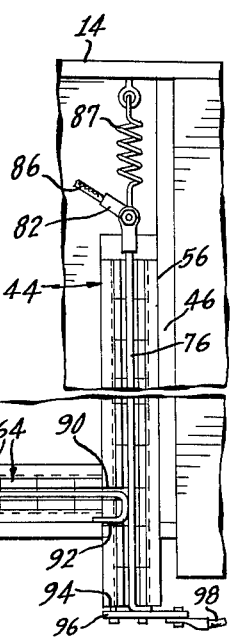
INVENTOR.
Seymour Zelnick
BY Harry Cohn
ATTORNEY

United States Patent Office 3,262,833
Patented July 26, 1966

3,262,833
IMPULSE RADIANT SEALER
Seymour Zelnick, Whitesville Road, Toms River, N.J.
Filed Dec. 17, 1963, Ser. No. 331,257
4 Claims. (Cl. 156—583)

This invention relates to heat sealing apparatus and more particularly to impulse radiant-heat sealing apparatus.

In conventional impulse trim sealing technique utilizing round heated sealing wires, the wire is generally mounted against a flat, insulated surface and the counterpressure sealing bar generally consists of a soft rubber covered with a thin layer of some resilient heat resistant material such as Teflon. In operation, the bars are clamped together under pressure with the film to be trim sealed in between. When the bars are fully clamped, the sealing wire is pulsed with a high current for a short period of time in order to rapidly bring it up to the fusion temperature of the plastic film. There are three major disadvantages to this technique when oriented or shrink type films are being trim sealed:

(1) Since the film is not being clamped close to the wire, as soon as the film is parted it will rapidly shrink away from the wire. This prevents the melting of a sufficient amount of material along the two edges of the film to form a maximum strength bead.

(2) Because of the relative softness of the rubber and the small diameter of the wire, the wire embeds itself in the rubber to a certain degree, and the peripheral contact of the rubber with the wire acts as a heat sink and prevents the wire from reaching high temperature.

(3) Certain shrink films, such as polyvinyl chloride, when subjected to the temperature required in trim sealing, deposit a residue on the sealing wire which rapidly builds up to the point where further operation is impossible until the residue is removed.

The above indicated disadvantages are obviated by the technique of the present invention, pursuant to the objects of the invention.

In the drawings: FIG. 1 is a perspective view of the apparatus; FIG. 2 is a top plan view of part of the apparatus of FIG. 1; FIG. 3 is a vertical sectional view, on a larger scale, taken on line 3—3 of FIG. 1 and with the apparatus in an operative heat-sealing position; and FIG. 4 is a perspective view of part of the heat-sealing and cutting member of the apparatus.

In accordance with the present invention, briefly described, the radiant-heat sealing round wire which has a diameter of about 0.032 inch is mounted in a V shaped groove formed by ceramic beads mounted in a dovetail slot in an aluminum bar. The dimensions of the V groove relative to the diameter of the wire is such that the wire is flush with the outer surfaces of the ceramic bead adjacent the groove. The beads provide a film clamping bar, the film being clamped between said outer surfaces of the ceramic beads and the confronting surface of a counter pressure bar. The counter pressure bar is of conventional construction, consisting of an aluminum bar covered with a soft silicone rubber and finally, covered with a .010" thick sheet of Teflon.

In operation, the bars are clamped together under pressure with the film to be trim sealed in between. Since the impulse wire is mounted flush with the surface of the ceramic beads, it does not embed itself in the rubber, thus minimizing the heat sink effect and permitting the wire to attain a higher temperature. The film instantaneously parts and melts back to the edges of the ceramic beads where it is securely clamped and where it forms a large bead required for optimum seal strength. Since the wire is flush with the surface of the beads, actual contact with the film is minimized thus considerably reducing any tendency for deposits to form on the wire.

Referring to the drawings in detail, the heat-sealing and cutting apparatus 10, here shown as a packaging machine, comprises the laterally spaced frame members 12 and 14 which support a U-shaped bracket 16 that carries a horizontal roller 18 on which a supply roll 20 of heat-sealable thermoplastic sheet material 22 is provided, for example transparent polyvinyl chloride, polyethylene, etc. The sheet material can be manually withdrawn from the supply roll and moved in the direction of its length so that it is disposed between heat-sealing and cutting means 24 and cooperating pressure means 26, the latter being mounted on a manually movable head 28. The heat-sealable sheeting material is folded longitudinally, to form superimposed layers 29 and 29a, before being wound into its roll which is positioned so that the folded edge 30 is at the rear of the apparatus. The head 28 is pivoted at 32 to frame member 14 and is provided with a handle 34 for moving the head to and from pressure applying or sealing position wherein pressure is applied on the layers of material which are engaged between the sealing means 24 and the pressure means 26.

The articles which are to be packaged in the sheet material are supported on a tray 36 and the level of the tray is adjustable to accommodate various heights of articles. For this purpose, the frame members 12 and 14 are each provided with a vertically extending slot 38 and a clamping screw 40 extends through each of the slots and is connected to a member 42 which extends downwardly from the bottom of the tray. When the screws are tightened, the head of the screw engages the portions of the frame member adjacent slot 38 for clamping the tray at a particular level. To adjust the level of the tray, the screws are loosened to permit them to move vertically up and down in their respective slots.

The heat-sealing and cutting means 24 comprises a stationary heat-sealing and cutting member 44 which extends transversely of the apparatus and is secured to a transversely extending bar 46 by screws 48. Another heat-sealing and cutting member 50 extends longitudinally of the apparatus and is secured to frame member 12 by screws 48. Transverse sealing member 44 extends from a rear position, beyond folded edge 30 of the heat-sealable material, forwardly to a position beyond the separate side edges 52 and 54 of the material to seal and separate a portion of the material at sealing member 44 from the supply roll 20. Sealing member 50 extends longitudinally of the apparatus and has one of its ends in abutment with transverse sealing member 44 at a position which is intermediate the ends of the latter member to seal and cut the material along a longitudinal line which extends from member 44 in a direction toward the tray end of the apparatus.

The heat-sealing and cutting members 44 and 50 are similar in construction. Each comprises an elongated bar 56 of a good heat-conducting material, for example aluminum, which is of relatively large mass so that it can quickly absorb and conduct heat for rapidly cooling the impulse-heated sealing and cutting element when the heating current is interrupted. The bar has a longitudinally extending groove 60 which is co-extensive therewith and has a cross section which is in the form of a mortise of a dovetail. More particularly, the laterally spaced side walls 62 of the groove diverge from each other in a downward direction from the top of the groove to the bottom thereof.

A series of separate ceramic electrical insulators 64, made of alumina oxide, for example, extend longitudinally in the groove in end-to-end abutting relation. Each insulator, hereinbefore referred to as a bead, is in the form of a block or bead which has longitudinally spaced parallel end walls 66 which extend perpendicularly between the laterally spaced parallel top 68 and bottom 70 of the block. The laterally spaced side walls 72 of the block extend longitudinally between the end walls 66 and diverge from the top surfaces 68 to the bottom 70 in the same amount as the corresponding side walls 62 of groove 60. It is to be observed that the cross section of insulators 64 is in the form of a tenon of a dovetail so that the insulators can be inserted endwise into the longitudinal groove 60 of the bar and are retained in the groove because of the dovetail shape provided by the diverging side walls of the groove and the insulators.

Each insulator bead 64 has an inwardly tapering or V-groove 74 which extends longitudinally from one end wall to the other and is in registry with the groove of the adjacent insulator so that a continuous longitudinal groove is formed in each of the heat-sealing and cutting members 44 and 50 which is co-extensive with the corresponding member. A radiant heat-sealing and cutting wire element 76 and 78 is positioned in the corresponding grove formed by insulators 64 of sealing members 44 and 50. The sealing elements 76 and 78 which are here shown in the form of metal wire has a high electrical resistance, for example a nickel-chromium alloy steel, which is also resistant to high temperatures. Said wire is preferably round and has a diameter of about 0.032 inch, and the groove is dimensioned so that the wire does not protrude appreciably beyond the film clamping surfaces 68 of the ceramic beads 64 which collectively form a film clamping bar. Said beads 64 preferably project slightly out of groove 62 of metal bar 56.

One end of each of the sealing elements 76 and 78 is provided with an electrical terminal 82 to which a lead 84, in the case of element 78, and a lead 86 in the case of element 76, is connected to provide the heating current for the corresponding element. A tension spring 87 has one of its ends connected to terminal 82 and its opposite end affixed to an electrically non-conducting member 88 which is connected to frame member 12, in the case of member 50, and to frame member 14 in the case of member 44.

As best seen in FIG. 2, the non-terminal end of sealing member 50 abuts against the side of sealing member 44, at a position intermediate the ends of the latter member. The non-terminal end of sealing element 78 extends from the end of bar 56 of member 50, and extends through a slot 90 provided in the side of the bar 56 of member 44, and is bent 90° so that it extends longitudinally of element 76 in contact therewith for a short distance. It is bent again 90° so that it extends in a direction parallel to itself through another slot 92 provided in the side of bar 56 of member 44 and is clamped in position between the side of member 50 and the side of frame member 12. In this manner, the non-terminal end of sealing element 78 is fixed against movement and is in electrical contact with sealing element 76.

The non-terminal end of sealing element 76 extends from the corresponding end of bar 56 of member 44 and is bent 90°. An electrical insulating member 94 extends across said end of the bar to retain the insulators 64 in position in the corresponding groove 60 and the bent portion of element 76 is fixed in position between insulating member 94 and an electrical conducting plate 96, with which it is in electrical contact and to which an electrical lead 98 is connected for providing heating current to element 76.

The heating elements 76 and 78 are grounded at the position at which they are in abutment with each other due to the engagement of the non-terminal end of element 78 with the grounded frame member 12. The terminal end of element 78 is provided with a grounded source of voltage (not shown) through lead 84. Both ends of sealing element 76 are connected to the terminals of another and separate source of voltage (not shown) through the corresponding leads 86 and 98. These separate sources of voltages supply a short impulse of high current to the corresponding heat-sealing and cutting element for rapidly heating it for the heat-sealing and cutting operation. The springs 87 apply tension along the length of the sealing and cutting element and thereby insure smooth expanding and contracting longitudinal movement of the element in its corresponding groove 74 and maintain the element in taut condition during said expansion and contraction. This is especially important in view of the fact that the heating current is applied to the element for a short impulse period and since it is very high and the element is thin and long, there is nearly instantaneous heating and expansion of the element. When the current impulse is interrupted, there is a rapid cooling and corresponding contraction of the element against the spring tension.

The low thermal mass of the heated element and its high electric resistance enables it to reach its sealing temperature very rapidly when current is transmitted therethrough as soon as switch 101 is operated by the closing of head 28 into operative position. The ceramic insulators 64 are not affected by the very high temperatures of the sealing elements and can operate for long periods of time without impairment of their electrical insulating properties. The current supplied to the heating elements 76 and 78 results in the rapid heating thereof and yet the large thermal mass of the bars 56 results in the maintenance of low temperatures for the other parts of the sealing members 44 and 50. This also has the effect of rapidly cooling the heating element between current pulses so that improved pressure sealing is obtained without impairment of the heat-sealed edges of the package when head 28 is held in operative position after the current pulse is terminated under the control of a timer (not shown) operated by switch 101. The ceramic insulators permit the sealing elements to be rapidly heated and yet are thin enough to allow the flow of heat therefrom to bar 56 between heat pulses. Preferably, the thickness of the ceramic material at each side of the ribbon is about one-sixteenth of an inch and the overall height of the insulators is about three-sixteenths of an inch. Groove 74 is about .038 of one inch deep. It will be noted further that bar 56 acts as a heat sink by reason of its own large thermal mass and that since the frame of the machine is made of metal and is in thermal-conductive relation with said bar, additional thermal conduction takes place, if needed, to prevent excess heating of the bar.

The counter-pressure aluminum bars 100, one for wire 76 and one for wire 78, are covered with a layer 102 of soft silicone rubber with a thin outer cover 104 of Teflon. The heat sealing members 44 and 50 may be mounted on the movable head 28 in the positions shown for bars 100, in which case said bars 100 would be mounted on stationary frame 12 in the positions shown for members 44 and 50. It will be understood, of course, that the present invention may be embodied not only in L heat sealing and cutting apparatus, selected for purposes of illustration, but is applicable generally to heat sealing and cutting apparatus of various kinds and for various purposes.

In the use of the apparatus, the heat-sealable material 22 is withdrawn from its roll 20 and placed between the heat-sealing and cutting means 24 and the pressure applying means 26. Head 28 is moved into operating position which operates switch 100 and impulse-heating current is passed through the sealing and cutting elements 76 and 78 for a predetermined period of time, as determined by the timer (not shown), to trim seal the material simultaneously along a transverse line which extends from the folded edge 30 of the material to edges 52 and 54 and along a line which extends from said transverse line in a longitudinal direction opposite folded edge 30 and in a direction toward the tray end of the apparatus. This sealing and cutting operation separates the portion of the material, which extends from transverse member 44 toward the tray end of the apparatus, from the supply roll 20 and this separated material is sealed along a transverse line and along a longitudinal line which is opposite folded edge 30. The portion of the material, which is still integral with roll 20, now has a forward transverse edge which is sealed. The material is further unwound and the forward transverse sealed edge is moved longitudinally of the apparatus between the pressure applying means 24 and the sealing and cutting means 26. The article A, which is to be packaged, is inserted between the layers 29 and 29a of the material, through the separate side edges 52 and 53, and the operating head is again moved into operative position to form a completely sealed package and simultaneously separate it from the supply roll 20.

It is to be observed that with each operation of the apparatus, the transverse rear sealed edge of a package is formed concurrently with the sealing of the forward transverse edge of the next package which is to be formed. All trim material which extends from sealing member 50 to the side edges 52 and 54 of the material is removed concurrently with the completion and separation of the package from the supply roll 20. The fact that heat-sealing and cutting member 44 extends beyond the side edges 52 and 54 of the material insures that completely sealed transverse edges are always formed which extend transversely of the material from one side edge to its opposite side edge. This eliminates the necessity of accurate transverse positioning of the material with respect to sealing member 50 which was necessary to avoid formation of packages which have unsealed corners, which may occur when members 44 and 50 form an L and member 44 does not extend beyond the side edges 52 and 54 of the material.

Since, as pointed out above, the wire 76, 78 is mounted flush with the top surfaces 68 of the ceramic beads, the wire does not embed itself in the Teflon-silicon layers of the counter-pressure bars and the other previously mentioned advantages are obtained. Also since the ceramic beads constitute one of the companion film clamping or pressing members, the melted film runs back to the edge of the clamp surface of the beads at the grooves 74, for example to the left upper edge of said grooves (viewing FIG. 3), where a longitudinally extending sealing bead is formed at the seal line between the film plies.

While I have shown and described the preferred embodiment of the invention, it will be understood that the invention may be embodied otherwise than as herein specifically illustrated or described and that certain changes in the form and arrangement of parts and in the specific manner of practicing the invention may be made without departing from the underlying idea or principles of this invention within the scope of the appended claims.

What is claimed is:

1. Heat sealing apparatus for sealing superimposed plies of thermoplastic film to each other along a predetermined line, comprising means for pressing confronting surface portions of said plies against each other adjacent said line, said pressing means comprising relatively movable confronting means having opposed surfaces for releasably clamping said surface film portions therebetween, one of said confronting means comprising a metal bar having spaced inner side walls defining a longitudinally extending groove with an opening facing the other of said confronting means, electrical insulation means in said groove of said bar, said insulation means comprising a series of ceramic blocks disposed in adjacent end-to-end relation in said groove of the bar, said blocks having grooves in registry with each other and collectively forming a groove having an opening adjacent said opening of said groove of the bar and extending longitudinally of said bar, the outer surfaces of said blocks adjacent said grooves therein forming at least part of one of said opposed surfaces of said film pressing means, said collectively formed groove of said ceramic blocks being V-shaped in cross section, and a radiant heating member disposed in and extending longitudinally of said grooves of said ceramic blocks and having an outer surface flush with yet spaced from said outer surfaces of said blocks for radiantly heating said film plies to their melting temperature adjacent said sealing line while said film surface portions are clamped between said pressing means, thereby heat-sealing said plies to each other.

2. Heat sealing apparatus for sealing superimposed plies of thermoplastic film to each other along a predetermined line, comprising means for pressing confronting surface portions of said plies against each other adjacent said line, said pressing means comprising relatively movable confronting means having opposed surfaces for releasably clamping said surface film portions therebetween, one of said confronting means comprising a metal bar having spaced inner side walls defining a longitudinally extending groove with an opening facing the other of said confronting means, electrical insulation means in said groove of said bar, said insulation means comprising a series of ceramic blocks disposed in adjacent end-to-end relation in said groove of the bar, said blocks having grooves in registry with each other and collectively forming a groove having an opening adjacent said opening of said groove of the bar and extending longitudinally of said bar, the outer surfaces of said blocks adjacent said grooves therein forming at least part of one of said opposed surfaces of said film pressing means, and a bare radiant heating wire disposed in and extending longitudinally of said grooves of said ceramic blocks and having an outer surface flush with yet spaced from said outer surfaces of said blocks for radiantly heating said film plies to their melting temperature adjacent said sealing line while said film surface portions are clamped between said pressing means, thereby heat-sealing said plies to each other.

3. Heat sealing apparatus for sealing superimposed plies of thermoplastic film to each other along a predetermined line, comprising means for pressing confronting surface portions of said plies against each other adjacent said line, said pressing means comprising relatively movable confronting means having opposed surfaces for releasably clamping said surface film portions therebetween, one of said confronting means carrying electrical insulating means having a longitudinally extending V-shaped groove therein, said groove having a longitudinally extending opening confronting the opposed film clamping surface of said pressing means, and a longitudinally extending radiant film heating and sealing member supported in said groove and extending longitudinally thereof, said radiant heating member having an outer upper surface within and spaced from said groove adjacent said surface of said one of said pressing means and facing the other one of said confronting means for radiantly heating said film plies to their melting temperature adjacent said sealing line while said film surface portions are clamped between said pressing means, thereby heat-sealing said plies to each other.

4. Heat sealing apparatus for sealing superimposed plies of thermoplastic film to each other along a predetermined line, comprising means for pressing confronting surface portions of said plies against each other adjacent said line, said pressing means comprising relatively movable confronting means having opposed surfaces for releasably clamping said surface film portions therebetween, one of said confronting means carrying electrical insulating means having a longitudinally extending V-shaped groove therein, said groove having a longitudinally extending opening confronting the opposed film clamping surface of said pressing means, and a longitudinally extending radiant film heating and sealing member supported in said groove and extending longitudinally thereof, said radiant heating member having an outer upper surface within and spaced from said groove adjacent said surface of said one of said pressing means and facing the other one of said confronting means for radiantly heating said film plies to their melting temperature adjacent said sealing line while said film surface portions are clamped between said pressing means, thereby heat-sealing said plies to each other, the outer surface of said insulation adjacent said groove providing one of said film clamping surfaces.

References Cited by the Examiner

UNITED STATES PATENTS

| | | | |
|---|---|---|---|
| 2,289,618 | 7/1942 | Young | 156—80 |
| 2,621,704 | 12/1952 | Langer | 156—583 |
| 2,625,201 | 1/1953 | Smith | 156—272 |
| 3,047,991 | 8/1962 | Siegel et al. | 156—583 |

EARL M. BERGERT, *Primary Examiner.*

DOUGLAS J. DRUMMOND, *Examiner.*